United States Patent [19]

Fritz et al.

[11] Patent Number: 5,230,806

[45] Date of Patent: * Jul. 27, 1993

[54] MODIFIED RESINS FOR SOLID-PHASE EXTRACTION

[75] Inventors: James S. Fritz; Jeffrey J. Sun, both of Ames, Iowa

[73] Assignee: Iowa State University Research Foundation, Inc., Ames, Iowa

[*] Notice: The portion of the term of this patent subsequent to Dec. 10, 2008 has been disclaimed.

[21] Appl. No.: 803,136

[22] Filed: Dec. 5, 1991

Related U.S. Application Data

[63] Continuation of Ser. No. 650,289, Feb. 4, 1991, Pat. No. 5,071,565.

[51] Int. Cl.⁵ .............................................. B01D 15/04
[52] U.S. Cl. ..................................... 210/692; 210/909
[58] Field of Search .............. 210/692, 693, 690, 691, 210/635, 908, 909; 525/54.1

[56] References Cited

U.S. PATENT DOCUMENTS

| | | | |
|---|---|---|---|
| 3,531,463 | 9/1970 | Gustafson | 210/692 |
| 4,154,674 | 5/1979 | Warshawsky et al. | 210/668 |
| 4,220,726 | 9/1980 | Warshawsky | 210/679 |
| 4,895,662 | 1/1990 | Stevens | 210/692 |
| 4,927,539 | 5/1990 | Stevens et al. | 210/635 |
| 5,019,269 | 5/1991 | Letourneur et al. | 210/656 |
| 5,030,352 | 7/1991 | Varady et al. | 210/502.1 |
| 5,071,565 | 12/1991 | Fritz et al. | 210/692 |
| 5,114,591 | 5/1992 | Patzelt et al. | 210/692 |

Primary Examiner—Wilbur Bascomb, Jr.
Assistant Examiner—Cynthia L. Nessler
Attorney, Agent, or Firm—Zarley, McKee, Thomte, Voorhees, & Sease

[57] ABSTRACT

A process of treating aqueous solutions to remove organic solute contaminants by contacting an aqueous solution containing polar organic solute contaminants with a functionalized polystyrene-divinyl benzene adsorbent resin, with the functionalization of said resin being accomplished by organic hydrophilic groups such as hydroxymethyl, acetyl and cyanomethyl.

6 Claims, No Drawings

MODIFIED RESINS FOR SOLID-PHASE EXTRACTION

This is a continuation of copending application Ser. No. 07/650,289, filed on Feb. 4, 1991, now U.S. Pat. No. 5,071,565, dated Dec. 10, 1991.

BACKGROUND OF THE INVENTION

Sold-phase extraction is now widely used for preconcentration and cleanup of analytical samples, for purification of various chemicals, and for large-scale applications such as removal of toxic or valuable substances from a variety of predominately aqueous solutions. Typical applications include methods for determination of trace amounts of pesticides, for determination of trace organic contaminants in water, for analysis of industrial waste water, determination of azaarenes in water, evaluation of porous polymers, isolation of organic compounds from ground water, sampling of priority pollutants in waste water, collection and concentration of environmental samples, and for pretreatment of urine samples.

For analytical purposes, solid phase extraction is usually performed using a small column or cartridge containing an appropriate resin. However, membranes loaded with appropriate resins have also been used for solid phase extraction. Following uptake of extractable solutes from a predominantly aqueous sample, it is common practice to elute the adsorbed materials from the resin by a small amount of an organic solvent such as ethyl acetate.

Chemically-bonded silica, usually with a $C_{18}$ or $C_8$ organic group, is by far the most commonly used material for solid phase extraction. Minor use has been made of porous polystyrene or other polymeric resins in solid phase extraction. However, these materials have several shortcomings for use in solid phase extraction. First, they are hydrophobic and therefore do not make good surface contact with predominately aqueous solutions. Secondly, pretreatment of the solid phase extraction materials with an activating solvent (such as methanol, acetone, or acetonitrile) must be used to obtain better surface contact with the aqueous solution being extracted; and, the activating solvent can be gradually leached out of the resin, thereby causing the extraction to become ineffective. This is particularly true if the solid phase extraction column inadvertently goes dry, causing air to be sucked into the column. Third, many types of organic compounds are incompletely extracted from predominately aqueous solutions. This is especially true with chemically-bonded silica resins.

In sum, it can be seen that the usual solid phase extraction adsorbent resin, that is chemically-bonded silica, often with the $C_{18}$ or $C_8$ organic group, has serious drawbacks. There is, therefore, a continuing need for a new type of chemically derivatized resin which overcomes the deficiencies of chemically-bonded silica, particularly for use with removal of polar organic solutes. The primary objective of the present invention is to fulfill this need.

The method and means of accomplishing the primary objective, as well as others will become apparent from the detailed description of the invention will follows hereinafter.

SUMMARY OF THE INVENTION

The invention is a process for treating aqueous solutions to remove organic solutes from the solution. The process comprises the step of contacting an aqueous solution containing some organics with a modified or functionalized polystyrene-divinyl benzene adsorbent resin. The resin is modified or functionalized by neutral, organic, hydrophilic groups. Preferably the organic moieties are selected from the group consisting of hydroxymethyl, acetyl and cyanomethyl. Acetyl is preferred. The process can be used to purify aqueous solutions of contaminants and it can be used for analytical determinations to determine levels on a parts per million or even parts per billion basis of organic contaminants present in aqueous solutions. The process is particularly useful for removal of phenols.

DETAILED DESCRIPTION OF THE INVENTION

In the present invention, a new chemically-modified polystyrene-divinyl benzene resin is prepared, which is hydrophilic and easily wetted by water while still keeping its extraction ability. In the examples described below, various organic compounds were tested by solid phase extraction using this new resin. The recovery results were compared with that of $SiC_{18}$ and un-derivatized polystyrene-divinyl benzene resin. This new resin showed superior recoveries for test compounds in solid phase extraction.

Polystyrene-divinyl benzene adsorbent resin is well known and there need not be any specific description provided herein. It is chemically available from many different sources and thus a description need not be given herein. It should however be of large surface area, typically 200 $m^2$/gram or more.

In accordance with the process of this invention, modification of the polystyrene-divinyl benzene adsorbent resin is accomplished in a Friedel Crafts reaction by conventional reaction techniques with a source for a neutral organic hydrophilic group. The groups used and thus satisfactory for this invention are hydroxymethyl, acetyl and cyanomethyl. It is important to note that these functionalized groups are neutral, that is they bear no positive or negative charge. This is important in order to allow for effective contaminant removal of the organics since either anionic or cationic charged resins may often pick up undesirable materials that are present such as inorganics. However, neutral functionalized or modified resins such as those described herein act differently than charged resins and take up the organics by adsorbtion rather than ion exchange.

The amount of functional group relative to the amount of polystyrene-divinyl benzene is not critical. Preferably the amount is from about 0.5 to about 1.5 millimoles per gram of resin.

As those skilled in the art know, the adsorbent resin can be used in the form of beads, pellets or any other form desirable for use, most often in a column. The adsorbent resin and the aqueous solution containing the polar organics may be contacted using conventional methods which result in intimate contact between the resin and the eluant. Suitable methods include fluidized beds, stirred tanks, batch tanks and cocurrent countercurrent flow columns. The contacting may occur batchwise, semi-batchwise, semi-continuously or continuously. Most preferably and commonly the eluant is contacted with the resin continuously in a packed column, as described in the examples below.

The residence time required for contact between the adsorbent resin and the aqueous solution depends on the properties of the resin, the particle size of the resin, the level of contaminants present initially, the level of purification desired, etc. Preferably, the required residence time is very short, probably the order of a few seconds or even less.

When the resin is packed in a column and aqueous solution containing organic solutes is passed therethrough, the organic solute is adsorbed onto the resin. The resin can be regenerated by using known techniques of washing out the organics. For example, washing can occur with common eluent solvents such as ethylacetate, methanol or acetone. After this is done, the resin is then ready for reuse.

The following examples, and data presented in tabular form show and demonstrate the effectiveness of various chemically modified polystyrene-divinyl benzene resins in solid phase extraction.

The polystyrene-divinyl benzene type resin (Amberchrome 161 or XAD-4 from Rohm and Haas Co., Philadelphia) with 50 $\mu$m particle size and surface area of about 720 m$^2$/g was cleaned by Soxhlet-extraction with methanol, ether and acetonitrile over night, dried and underwent following synthetic procedures.

For purposes of the test described in these examples, the polystyrene-divinyl benzene type resin was modified or functionalized with three different groups: acetyl, hydroxymethoxy and cyanomethyl. These samples of the resin, modified with each of the functionalized groups previously described were prepared in the following manner. First, the acetyl modified group was prepared as next described.

To 5.1 g of resin 30 ml of carbon disulfide was added, 9.5 g of anhydrous aluminum chloride was added and, 5.5 g of acetyl chloride were added dropwise. It was kept at 50° C. for 24 h. The product was then poured into ice water. The resin was isolated, washed with acetone, methanol and water, then dried. The presence of a carbonyl group was proved by a good band at 1690 cm$^{-1}$ on the spectrum obtained by FT-IR. The concentration of acetyl on the resin was determined as 1.2 mmol/g by derivatization of the —CO— group.

The hydroxy-methyl derivative was prepared in the following manner:

1.2 grams of paraformaldehyde, 16 ml of acetic acid, and 4 ml of acetic anhydride were added to 5.2 g resin. This was stirred for a few minutes, then 6.0 g of anhydrous zinc chloride was added and it was kept at 60° C. overnight. The resin was then filtered, rinsed with methanol, then heated with a solution of 90% methanol-10% conc. HCl for 1 h. The final product was washed with methanol and dried. The concentration of hydroxymethyl on the resin was 1.3 mmol/g. This was determined by a standard acetylation procedure using acetic anhydride in pyridine as the reagent.

The cyanomethyl derivative was prepared in the following manner. To 5.4 g of resin was added 30 ml of tetrachloroethane and 20 ml of chloroacetonitrile. It was kept at 85° C. for 24 h. The product was poured into ice water, then washed and dried. The concentration of cyanomethyl on the resin was 0.9 mmol/g, as determined by nitrogen analysis.

All solid phase extractions were performed on small columns (solid phase extraction columns) packed with 100 mg of resin. Different resins were used in this experiment. The commercial SiC$_{18}$ solid phase extraction column with resin of 40 $\mu$m size was obtained from Alltech Associates, Inc. (Deerfield, Ill.). The inside diameter and the length of the solid phase extraction column were 6 and 55 mm. Approximately 100 mg of derivatized and underivatized Amberchrome 161 resins were packed into empty columns, which were obtained from P. J. Cobert Associates, Inc. (St. Louis, Mo.), of the same size as the SiC$_{18}$ solid phase extraction column. The solid phase extraction column was connected to a home-made reservoir by an adaptor (P. J. Cobert Associates, Inc.) for solid phase extraction. The flow rate of the sample solution from the reservoir through the solid phase extraction column was controlled by air pressure on the top of the reservoir.

The organic compounds eluted from solid phase extraction column by ethyl acetate were collected and then analyzed by a HP5880A gas chromatography instrument with a flame ionization detector, a HP5880A series level 4 integrator, and a HP7673A automatic sample (Hewlett-Packard Co., Avondale, Pa.). The gas chromatography columns used were J. & W. fused silica capillary megabore DB-5 and minibore DB-1 (Alltech Associates, Inc.).

A Bruker FT-IR 98 instrument (USA Bruker Instruments Inc., San Jose, Calif.) was used for structure determination.

The solid phase extraction columns were cleaned with methanol, ethyl acetate and acetonitrile, and then dried. Two loading methods were compared: wet column loading and dry column loading. In wet column loading, which can also be called conditioned loading, the solid phase extraction column was wetted with methanol and then the sample solution was forced through the solid phase extraction column. In dry column loading, the solid phase extraction column was totally dried before the sample solution was forced through the solid phase extraction column.

In the solid phase extraction experiments, the sample organic compounds to be tested were added into 20 ml of pure water. The concentration of sample compounds were about 5 ppm. The sample solution was then added into a reservoir and the air pressure on the top of the reservoir was adjusted to make the flow rate of the sample solution to be 5 ml/min when passing through the solid phase extraction column. After the sample solution was passed through the solid phase extraction column, the column was washed with 1 ml of pure water. After the last drop of water was passed through, air was blown through the column for a few seconds to ensure that all the water was removed.

To elute the columns, they were taken off from the reservoir and 1 ml of ethyl acetate was added. The column was connected to the reservoir again and the air pressure was adjusted to make the eluate to pass through the column at the flow rate of 1 ml/min. The retained organic compounds were eluted and the eluate was collected in a small vessel until the last drop of ethyl acetate passed through the column. An internal standard of exact amount was added into the vessel, which was capped immediately, mixed well, and was ready for gas chromatographic determination.

The vessel was directly used in the automatic injection sampler which was equipped on the HP5880A gas chromatography instrument. The injection volume was 1 $\mu$l. The carrier gas was nitrogen, flow rate was 15 ml/min, the split ratio was 1:40. Temperature programming was used to get best separations. An exact aliquot of the loading standard samples dissolved in 1 ml of ethyl acetate with the same amount of internal standard were also made, mixed well in another vessel, and injected immediately into gas chromatography instrument under the exact same conditions. The relative peak areas were used for quantification and the percentage recoveries of the organic compounds were calculated from relative peak areas directly. Recoveries were calculated as average values and represented more than two different analysis.

Resins containing various hydrophilic organic functional groups were prepared as earlier described. The ability of the resins to retain various organic compounds in solid-phase extraction was surveyed by packing a column with each resin and passing a very dilute (about 5 ppm) aqueous solution of the organic compounds through each column. Columns containing the un-derivatized resin (Amberchrome 161, a polystyrene-divinylbenzene resin) and a widely-used $C_{18}$ silica resin were also compared with the derivatized resins. Each of the resin columns was first treated with an "activating" organic solvent (1-2 ml of methanol) before adding the aqueous sample. After passing the aqueous sample through the columns, the adsorbed organic solutes were eluted by passing a small volume of ethyl acetate through each column. The amount of each organic solute in this eluate was then determined by gas chromatography.

It can be seen that the resins modified in accord with this invention were the most effective for solid-phase extraction and subsequent elution of various organic compounds, as summarized by the results in Table I (phenols and aromatic compounds), Table II (multi-hydroxy phenolic compounds), and Table III (aliphatic and pyridine compounds). For each class of organic compounds the average recovery was much higher using Amberchrome 161 than with the $C_{18}$ silica material. However, the average recovery was higher using the hydroxymethyl-derivatized resin and was the highest using the acetyl-derivatized resin. Another set of experiments showed that the cyanomethyl-derivatized resin was somewhat superior to underivatized Amberchrome 161 for solid-phase extraction, but not quite as good as the hydroxymethyl- or acetyl-derivatized resins.

These solid-phase extractions were then repeated using columns that were filled with dry resins. The aqueous sample was passed through each column without any preliminary treatment of the column with an "activating" organic solvent (such as methanol). The results in Tables IV, V, and VI showed much higher recoveries of the organic compounds with the derivatized resin columns than with the $C_{18}$ silica or un-derivatized Amberchrome 161 columns.

The "recovery" of various organic solutes in solid-phase extraction actually is a combination of two processes: (1) the extraction of the solutes from a predominantly aqueous phase into the solid resin phase, and (2) the subsequent elution of the solutes from the solid phase into a small volume of an organic solvent. An experiment was performed to compare the ability of different resins to achieve only the first of these two steps. In this experiment a standard chromatographic spectrophotometric detector was connected to the bottom of a small resin column (4 mm length × 4 mm inside diameter). A small amount of an organic solute was added to the top of the column and either pure water or water containing 5% by volume of acetonitrile was pumped through the column and detector to measure the retention time ($t_R$) of the organic solute. The column dead time ($t_o$) was also measured and the capacity factor (k') of the solute calculated from the well-known expression:

$$k = \frac{t_R - t_o}{t_o}.$$

Table VII compares the k' values obtained for five different solutes on three different resins. Much higher k' values were obtained on the organic resin columns than on the $C_{18}$ silica column. Each of the three phenols has much k' values on the acetyl-derivatized resin than on the un-derivatized resin column. These results demonstrate that the acetyl-derivatized resin is greatly superior to the other resins in its ability to retain polar organic compounds such as phenols by solid-phase extraction.

An examination of the data presented in the above examples and Tables I–VII demonstrate the superiority of the functionalized polystyrene-divinylbenzene adsorbent resin of the present invention for the removal of organic solutes, particularly for removal of polar organic solutes, and most particularly for phenols. It therefore can be seen that the invention accomplishes at least all of its stated objectives.

TABLE I

The recoveries (%) of Phenolic and aromatic compounds by different sorbents under wet SPE column loading condition.

| Compound | $SiC_{18}$ | Amber-chrome | Amber-chrome —$CH_2OH$ | Amber-chrome —$COCH_3$ |
|---|---|---|---|---|
| Phenol | 6.3 | 90.7 | 94.0 | 99.7 |
| p-Cresol | 16.2 | 91.1 | 98.1 | 100.9 |
| P-Ethylphenol | 65.9 | 96.0 | 98.5 | 101.2 |
| 2-Nitrophenol | 44.7 | 92.9 | 94.9 | 96.0 |
| 3-Nitrophenol | <5 | 81.0 | 84.9 | 92.5 |
| 4-Nitrophenol | <5 | 87.0 | 85.7 | 86.6 |
| 2,4-Dimethylphenol | 70.8 | 94.7 | 97.3 | 100.2 |
| 4-t-Butylphenol | 82.9 | 88.2 | 95.5 | 99.5 |
| Anisol | 77.9 | 90.6 | 94.1 | 98.1 |
| Aniline | 9.1 | 94.0 | 96.1 | 99.5 |
| Benzylalcohol | 10.2 | 91.5 | 9B.2 | 99.2 |
| Nitrobenzene | 53.6 | 92.4 | 96.3 | 99.9 |
| 2,4-Dinitroflouro-benzene | 43.9 | 83.0 | 96.0 | 98.4 |
| o-Hydroxyaceto-phenone | 88.1 | 84.9 | 94.7 | 96.0 |
| Isopentylbenzoate | 83.8 | 71.8 | 89.2 | 95.2 |
| Diethylphthalate | 90.2 | 87.2 | 95.5 | 100.1 |
| Average | 47.1 | 88.6 | 94.3 | 97.6 |

TABLE II

The recoveries (%) of multi-hydroxy phenolic compounds under wet SPE column loading condition.

| Compound | $SiC_{18}$ | Amber-chrome | Amber-chrome —$CH_2OH$ | Amber-chrome —$COCH_3$ |
|---|---|---|---|---|
| Catechol | 0 | 71.9 | 88.6 | 75.1 |
| Resorcinol | 0 | 61.3 | 88.2 | 97.4 |
| o-Methylresorcinal | 0 | 82.9 | 97.2 | 98.6 |
| Hydroquinone | 0 | 25.7 | 71.8 | 86.9 |
| Methylhydro-quinone | 0 | 77.7 | 97.7 | 99.0 |
| Phloroglucinol | 0 | 0 | 23.8 | 55.5 |

TABLE III

The recoveries (%) of phenolic and aromatic compounds by different sorbents under wet SPE column loading condition.

| Compound | SiC$_{18}$ | Amber-chrome | Amber-chrome —CH$_2$OH | Amber-chrome —COCH$_3$ |
|---|---|---|---|---|
| Pentanone | 20.4 | 91.0 | 94.1 | 97.2 |
| Octanone | 90.8 | 88.5 | 96.8 | 98.3 |
| Hexylacetate | 85.4 | 70.0 | 87.8 | 92.1 |
| Mesityl oxide | 58.1 | 76.2 | 97.2 | 97.5 |
| Ethyl crotonate | 76.3 | 73.7 | 96.5 | 97.0 |
| Hexenyl acetate | 71.5 | 58.5 | 86.1 | 85.0 |
| 3-Picoline | 41.4 | 91.6 | 96.3 | 97.0 |
| 3-Ethylpyridine | 75.7 | 95.3 | 97.3 | 96.5 |
| Average | 65.0 | 80.6 | 94.0 | 95.1 |

TABLE IV

The recoveries (%) of phenolic and aromatic compound by different sorbents under dry SPE column loading condition.

| Compound | SiC$_{18}$ | Amber-chrome | Amber-chrome —CH$_2$OH | Amber-chrome —COCH$_3$ |
|---|---|---|---|---|
| Phenol | <3 | 3.1 | 75.2 | 92.8 |
| p-Cresol | 4.4 | 12.4 | 87.9 | 93.7 |
| p-Ethylphenol | 15.3 | 37.1 | 96.8 | 98.8 |
| 2-Nitrophenol | 17.2 | 47.0 | 95.8 | 95.6 |
| 3-Nitrophenol | <5 | <5 | 74.9 | 72.5 |
| 4-Nitrophenol | <5 | <5 | 77.3 | 84.8 |
| 2,4-Dimethylphenol | 20.7 | 41.6 | 96.0 | 98.1 |
| 4-t-Butylphenol | 49.0 | 50.0 | 89.6 | 95.0 |
| Anisol | 58.4 | 55.9 | 94.8 | 96.2 |
| Aniline | <5 | 25.8 | 89.5 | 96.1 |
| Benzylalcohol | <5 | 17.4 | 85.1 | 98.5 |
| Nitrobenzene | 27.4 | 50.5 | 96.0 | 97.2 |
| 2,4-Dinitroflourobenzene | 3.7 | 23.2 | 92.0 | 94.3 |
| o-Hydroxyacetophenone | 66.7 | 54.3 | 94.0 | 94.2 |
| Isopentylbenzoate | 60.2 | 73.0 | 83.8 | 84.7 |
| Diethylphthalate | 70.2 | 58.0 | 84.2 | 89.5 |
| Average | 26.0 | 34.9 | 88.3 | 92.6 |

TABLE V

The recoveries (%) of multi-hydroxy phenolic compounds under dry SPE column loading condition.

| Compound | SiC$_{18}$ | Amber-chrome | Amber-chrome —CH$_2$OH | Amber-chrome —COCH$_3$ |
|---|---|---|---|---|
| Catechol | 0 | 0 | 8.6 | 29.9 |
| Resorcinol | 0 | 0 | 0 | 94.5 |
| o-Methylresorcinal | 0 | 0 | 15.6 | 95.6 |
| Hydroquinone | 0 | 0 | 0 | 80.9 |
| Methylhydroquinone | 0 | 0 | 4.9 | 93.8 |
| Phloroglucinol | 0 | 0 | 0 | 42.0 |

TABLE VI

The recoveries (%) of phenolic and aromatic compounds by different sorbents under dry SPE column loading condition.

| Compound | SiC$_{18}$ | Amber-chrome | Amber-chrome —CH$_2$OH | Amber-chrome —COCH$_3$ |
|---|---|---|---|---|
| Pentanon | 7.6 | 60.5 | 91.5 | 92.6 |
| Octanone | 70.1 | 84.5 | 91.4 | 94.6 |
| Hexylacetate | 78.1 | 64.8 | 75.8 | 83.0 |
| Mesityl oxide | 37.6 | 23.8 | 97.0 | 97.2 |
| Ethyl crotonate | 54.7 | 28.2 | 98.0 | 97.1 |
| Hexenyl acetate | 65.4 | 26.9 | 77.7 | 78.6 |
| 3-Picoline | 31.0 | 48.2 | 88.4 | 91.1 |
| 3-Ethylpyridine | 59.8 | 70.2 | 92.6 | 95.5 |
| Average | 50.5 | 50.9 | 89.1 | 91.2 |

TABLE VII k' of various compounds on the mini-columns (4 mm L × 4 mm ID) packed with different resins

| Resin | SiC$_{18}$ | | PS/DVB | | PS/DVB-COCH$_3$ | |
|---|---|---|---|---|---|---|
| ACN % | 0% | 5.0% | 0% | 5.0% | 0% | 5.0% |
| Phenol | 23.7 | 14.8 | 119.5 | 45.3 | 515.8 | 69.0 |
| p-Cresol | 73.2 | 39.5 | 779.0 | 181.1 | * | 229.1 |
| p-Ethylphenol | 227.4 | 104.3 | 2472.7 | 501.6 | * | 597.4 |
| Acetophenone | 150.1 | 46.9 | * | 396.4 | * | 269.2 |
| Toluene | 254.8 | 182.2 | * | 1214.8 | * | 751.6 |

* The compounds tested were not eluted from the mini-column.

What is claimed is:

1. A process of treating an aqueous solution to remove organic solutes, said method comprising:
   contacting an aqueous solution containing some organics with a functionalized and neutral polystyrene-divinyl benzene adsorbent resin:
   said resin being functionalized by organic, hydrophilic groups.

2. The process of claim 1 wherein the functionalized groups are present at from about 0.5 to about 1.5 millimoles per gram of adsorbent resin.

3. The process of claim 1 wherein the organics are phenols.

4. A method of analytically determining levels of polar organics to aqueous solutions, said method comprising:
   contacting an aqueous solution containing some polar organics with a functionalized and neutral polystyrene-divinyl benzene adsorbent resin;
   said resin being functionalized by organic, hydrophilic groups, and thereafter;
   washing the polar organics out of said adsorbent resin with a suitable element, and thereafter;
   analytically determining the level of polar organics present.

5. The process of claim 4 wherein the functionalized groups are present at from about 0.5 to about 1.5 millimoles per gram of adsorbent resin.

6. The process of claim 4 wherein the organics are phenols.

* * * * *